(12) United States Patent
Shirodkar et al.

(10) Patent No.: US 10,822,479 B2
(45) Date of Patent: Nov. 3, 2020

(54) FOAMED POLYETHYLENE COMPOSITIONS

(71) Applicant: ExxonMobil Chemical Patents Inc., Baytown, TX (US)

(72) Inventors: Pradeep P. Shirodkar, Houston, TX (US); Jianya Cheng, Kingwood, TX (US); Joseph M. Tomei, Akron, OH (US); Peijun Jiang, League City, TX (US); Arturo Leyva, League City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 674 days.

(21) Appl. No.: 14/596,516

(22) Filed: Jan. 14, 2015

(65) Prior Publication Data

US 2015/0126634 A1    May 7, 2015

Related U.S. Application Data

(63) Continuation-in-part of application No. 13/623,242, filed on Sep. 20, 2012, now Pat. No. 9,580,533.

(Continued)

(51) Int. Cl.
*C08L 23/08*  (2006.01)
*C08J 9/00*   (2006.01)
(Continued)

(52) U.S. Cl.
CPC ........ *C08L 23/0815* (2013.01); *C08F 210/18* (2013.01); *C08J 5/18* (2013.01);
(Continued)

(58) Field of Classification Search
CPC . C08J 9/10–108; C08J 9/02; C08J 9/04; C08J 9/06; C08J 9/065; C08J 9/08;
(Continued)

(56) References Cited

U.S. PATENT DOCUMENTS 3,261,889 A    7/1966  Wout
4,533,578 A    8/1985  Boyd et al.
(Continued)

FOREIGN PATENT DOCUMENTS

WO    2001/53364           7/2001
WO    WO 0162808 A1 *  8/2001  ............ C08F 210/02
(Continued)

OTHER PUBLICATIONS

Schut, "*Foamed Films Find New Niches*," Plastics Technology Online, Feb. 2002, pp. 48-55.
(Continued)

*Primary Examiner* — Ling Siu Choi
*Assistant Examiner* — David L Miller
(74) *Attorney, Agent, or Firm* — ExxonMobil Chemical Patents Inc.—Law Department

(57) ABSTRACT

A foamable or foamed article comprising a diene terpolymer, the diene terpolymer comprising (or consisting essentially of) from 0.01 wt % to 10.0 wt % diene derived units, and 1.0 wt % to 20 wt % of $C_4$ to $C_{10}$ α-olefin derived units based on the weight of the diene terpolymer, wherein the diene terpolymer: a) has a $g'_{vis}$ of less than 0.90; b) has an Mw within a range of from 100,000 g/mol to 500,000 g/mol; c) has an Mw/Mn within the range of from 3.5 to 12.0; and d) an Mz/Mn of greater than 7.0. Inventive articles comprise a blend of a relatively high density linear polyethylene and the diene terpolymer.

20 Claims, 4 Drawing Sheets

Related U.S. Application Data

(60) Provisional application No. 61/933,459, filed on Jan. 30, 2014.

(51) Int. Cl.
*C08F 210/18* (2006.01)
*C08J 5/18* (2006.01)
*C08J 9/06* (2006.01)

(52) U.S. Cl.
CPC ........... *C08J 9/0061* (2013.01); *C08L 23/083* (2013.01); *C08J 9/06* (2013.01); *C08J 2201/03* (2013.01); *C08J 2323/06* (2013.01); *C08J 2323/08* (2013.01); *C08J 2447/00* (2013.01); *C08L 23/0823* (2013.01); *C08L 2203/16* (2013.01); *C08L 2205/025* (2013.01); *C08L 2207/07* (2013.01); *C08L 2314/06* (2013.01)

(58) Field of Classification Search
CPC .. C08F 210/18; C08L 23/083; C08L 23/0823; C08L 2207/07
See application file for complete search history.

(56) References Cited

U.S. PATENT DOCUMENTS

| | | | |
|---|---|---|---|
| 4,657,811 A | 4/1987 | Boyd et al. | |
| 5,670,595 A | 9/1997 | Meka et al. | |
| 6,114,457 A | 9/2000 | Markel et al. | |
| 6,147,180 A | 11/2000 | Markel et al. | |
| 6,300,451 B1* | 10/2001 | Mehta | C08F 210/18 526/127 |
| 6,355,757 B2 | 3/2002 | Garcia-Franco et al. | |
| 6,391,998 B1 | 5/2002 | Garcia-Franco et al. | |
| 6,417,281 B1 | 7/2002 | Garcia-Franco et al. | |
| 6,433,090 B1* | 8/2002 | Ellul | C08L 23/16 525/191 |
| 6,509,431 B1 | 1/2003 | Duttweiler et al. | |
| 6,734,265 B1 | 5/2004 | Dekmezian et al. | |
| 6,870,010 B1 | 3/2005 | Lue et al. | |
| 7,687,580 B2 | 3/2010 | Lohse et al. | |
| 8,512,837 B2 | 8/2013 | Barreneche | |
| 9,321,911 B2 | 4/2016 | Shirodkar et al. | |
| 9,340,664 B2 | 5/2016 | Shirodkar et al. | |
| 2002/0128390 A1* | 9/2002 | Ellul | C08L 23/10 525/191 |
| 2003/0139530 A1 | 7/2003 | Starita | |
| 2003/0187083 A1 | 10/2003 | Harris | |
| 2004/0118592 A1* | 6/2004 | Pehlert | C08L 23/0815 174/110 R |
| 2007/0260016 A1* | 11/2007 | Best | B32B 27/32 525/240 |
| 2008/0138593 A1* | 6/2008 | Martinez | C08J 9/0061 428/220 |
| 2008/0153997 A1* | 6/2008 | Casty | C08F 10/06 526/88 |
| 2009/0197029 A1 | 8/2009 | Iyer et al. | |
| 2010/0092709 A1 | 4/2010 | Joseph | |
| 2013/0090433 A1 | 4/2013 | Jiang et al. | |
| 2013/0209774 A1 | 8/2013 | Shirodkar et al. | |
| 2013/0216812 A1 | 8/2013 | Cheng et al. | |
| 2013/0224463 A1 | 8/2013 | Shirodkar et al. | |
| 2015/0125645 A1 | 5/2015 | Cheng et al. | |
| 2015/0126634 A1 | 5/2015 | Shirodkar et al. | |
| 2016/0272798 A1 | 9/2016 | Cheng et al. | |

FOREIGN PATENT DOCUMENTS

| | | | |
|---|---|---|---|
| WO | 2002/085954 | 10/2002 | |
| WO | 2007/067307 | 6/2007 | |
| WO | 2007/136494 | 11/2007 | |
| WO | 2007/136494 A | 11/2007 | |
| WO | 2013/043796 | 3/2013 | |
| WO | WO-2014046777 A1 * | 3/2014 | ............. C08L 23/04 |

OTHER PUBLICATIONS

Guzmán, Job D. et al., "Simple Model to Predict Gel Formation in Olefin-Diene Copolymerizations Catalyzed by Constrained-Geometry Complexes," AIChE Journal, 2010, 56(5), pp. 1325-1333.
Liu, Han-Tai et al., "Bimodal polyethylene products from UNIPOL™single gas phase reactor using engineered catalysts," Macromolecular Symposia, 2003, vol. 195, pp. 309-316.

* cited by examiner

FOAMED POLYETHYLENE COMPOSITIONS

CROSS-REFERENCE TO RELATED APPLICATION

This invention claims priority, as a Continuation-in-Part, to U.S. Ser. No. 13/623,242, filed on Sep. 20, 2012, which is incorporated by reference herein. The disclosure of U.S. Ser. No. 61/933,459, filed on Jan. 30, 2014, is also incorporated by reference herein.

FIELD OF THE INVENTION

The present invention relates to diene terpolymers, and polyethylene compositions useful in foamable or foamed articles comprising linear polyethylenes and diene terpolymers.

BACKGROUND

Foamed sheets, films and other "articles" are used in many applications, particularly in blown-film applications including consumer trash bags, grocery bags, produce bags, pallet wrap, food wrap, liners, heavy duty bags, industrial bags, consumer bags, shrink films, labels, pouches for FFS packaging, tapes, stand-up pouches, lamination films, protective films, health and hygiene film applications. Similar thin foamed films can be made using cast film and sheet extrusion lines, but these will exhibit preferential orientation in the MD direction and hence weaker properties. Foamed films can be made in the form of monolayer or coextruded films with multiple layers, where one or more of the layers are foamed. These thin foamed films can be further laminated to other substrates including, foil, paper, other plastics, or they can be post stretched in one or two directions for obtaining wrinkled skin surface effects. In the polyolefin industry, there has been a general trend to produce new high strength polymer resins. These resins have allowed film producers to down-gauge their product without sacrificing film strength or toughness.

These thinner products have not been universally accepted however, as the perception of films having a limp or flimsy feel has been negative. Accordingly, it is desired to produce films of greater thickness. It is not cost effective to simply use more resin to make a thicker sheet however, because of the cost of additional raw material. It is generally known that polyolefin resins can be foamed in order to produce a thicker film with the same amount of resin. It is generally understood, however, that properties such as tensile strength, impact strength and elongation are related to density, and that the foaming process results in a product having less density and potential for weak failure spots. Thus, prior films or thin sheets made from foamed polyolefin material lacked adequate strength.

High pressure LDPE resins have been used in foaming applications due to their relatively high melt strength, strain hardening behavior and easy processing. However, when making a foamed sheet at gauges between 1 and 8 mils using conventional blown film processes with these resins, excessive orientation results, which in turn leads to very poor results in MD (machine direction) tear strength. Accordingly there is a need for thin films of reduced density which still exhibit acceptable physical properties, particularly MD tear strength. As discussed in "Foamed Films Find New Niches", Plastics Technology Online, (February 2002), crosslinking is also being investigated as a way to improve mechanical support of thin foamed films. Crosslinking adds cost and complexity to the process, and results in material which cannot be easily recycled, and is therefore a less than ideal solution.

Yet another approach to improve physical properties is bi-orientation. Traditional tenter frame bi-axial orientation for cast films are typically done in the semi-solid phase using a two-step process (machine and transverse-direction orientation), usually ending in collapsing of the foam cells. Traditional blown film process can achieve simultaneous orientation both in the machine direction and in the transverse direction, being able to apply up to, for example, 3:1 MD and 4:1 TD orientation levels, while the polymer is in the semi-molten state.

LLDPEs alone are known to have poor melt strength and this property is further reduced as the Melt index of the polymer is increased (that is, the molecular weight is reduced). For this reason, the use of these resins in non-cross linked foaming applications has been limited to blends in small amounts where the major component is a high melt strength polymer like Low Density Polyethylene, (LDPE).

Accordingly, new and improved methods of strengthening foamed articles would be desirable. The inventors have found a simple and cost effective way of achieving this.

Publications of interest include: U.S. Pat. Nos. 8,512,837; 7,687,580; 6,509,431; 6,355,757; 6,391,998; 6,417,281; 6,300,451 U.S. Pat. Nos. 6,114,457; 6,734,265; 6,147,180; 6,870,010; 5,670,595; 4,657,811; 4,533,578; WO 2013/043796; WO 2007/067307; WO 2002/085954; US 2007/0260016; US 2010/092709, US 2013/0090433; US 2013/209774; US 2013/224463; 2013/216812; Guzman, et al. in 56(5) AIChE Journal, 1325-1333 (2010); and "Bimodal polyethylene products from UNIPOL™ single gas phase reactor using engineered catalysts," Liu et al. in 195 MACROMOLECULAR SYMPOSIA, (2003).

SUMMARY

The present invention is directed to a foamed or foamable article comprising (or consisting essentially of) a blend of a diene terpolymer and a linear polyethylene, the diene terpolymer comprising (or consisting essentially of) from 0.01 wt % to 10.0 wt % diene derived units, and 1.0 wt % to 20 wt % of $C_4$ to $C_{10}$ α-olefin derived units based on the weight of the diene terpolymer, wherein the diene terpolymer: a) has a $g'_{vis}$ of less than 0.90; b) has an Mw within a range of from 100,000 g/mol to 500,000 g/mol; c) has an Mw/Mn within the range of from 3.5 to 12.0, and d) an Mz/Mn of greater than 7.0.

DETAILED DESCRIPTION

Figure 1:
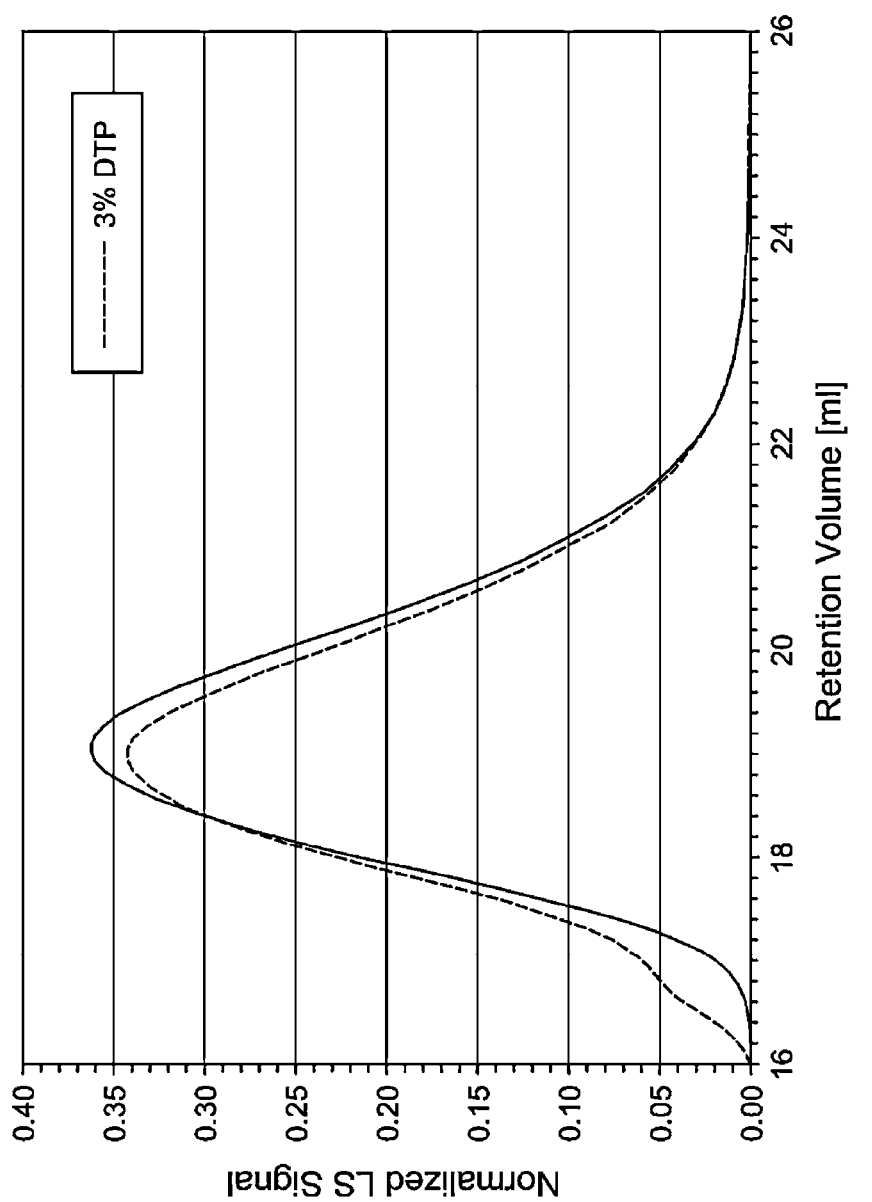
FIG. 1 is a graphical representation of GPC curves for a blend of 3 wt % of the branched modifier (or "diene terpolymer" ("DTP") and Enable™ 3505 and neat Enable 3505 (comparative linear polyethylene having a $g'_{vis}$ of greater than 0.90).
Figure 2:
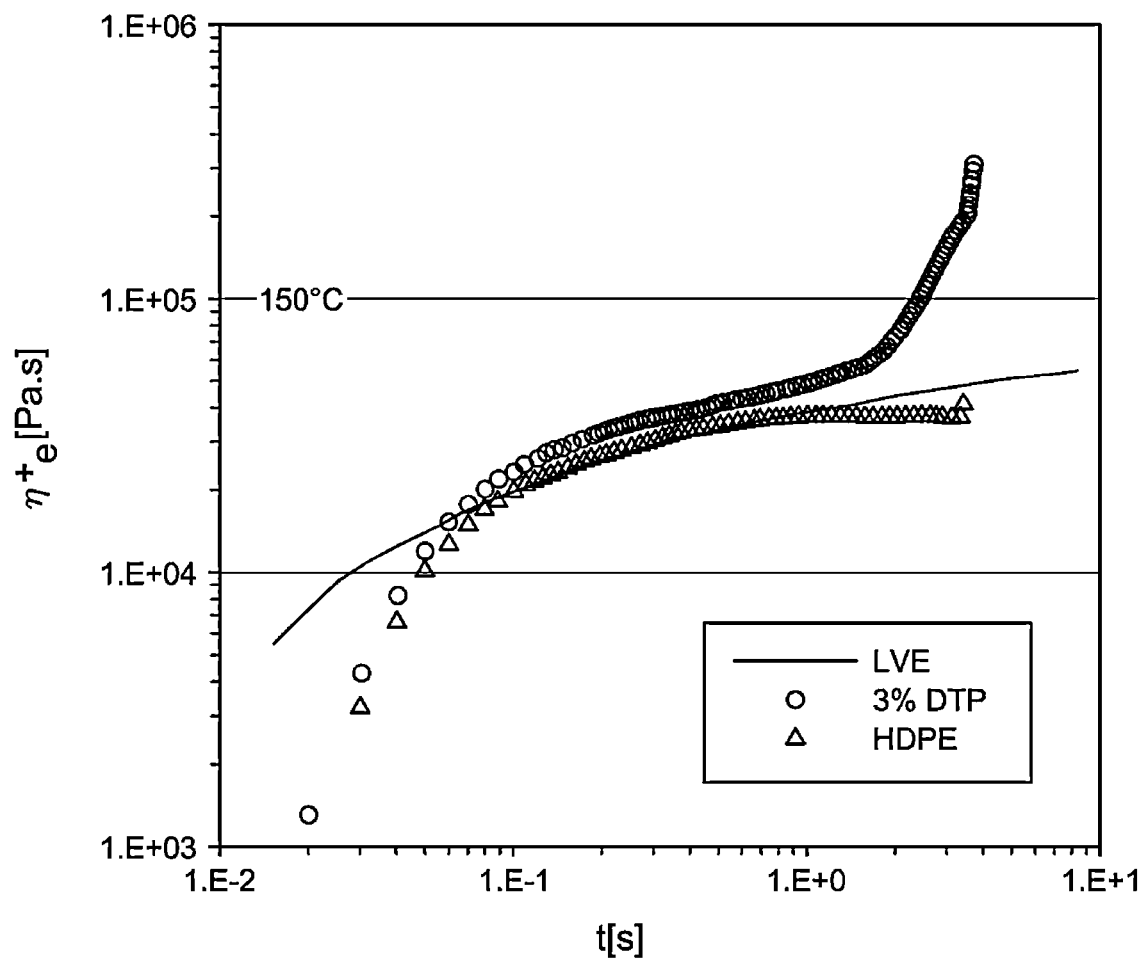
FIG. 2 is a graphical representation of the Strain Hardening Behavior of the DTP and inventive HDPE Blend ("LVE" is Linear Viscoelastic Envelope).
Figure 3:
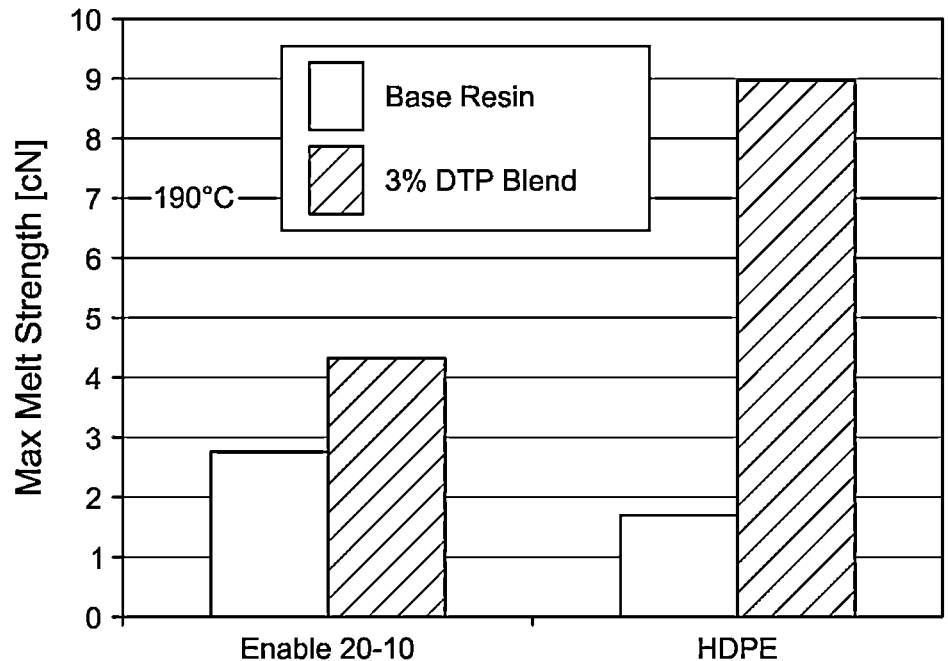
FIG. 3 is a graphical representation of the Melt Strength for inventive DTP Blends.
Figure 4:
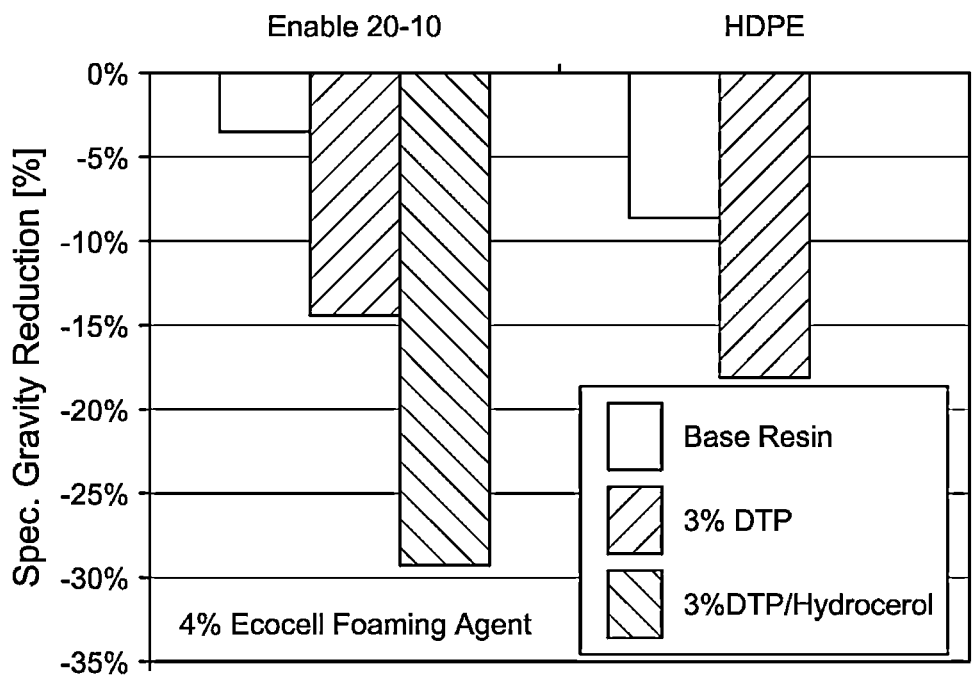
FIG. 4 is a graphical representation of the Specific Gravity Reductions in the inventive blends.

This invention relates to a polyethylene-based, highly branched polyethylene diene terpolymer ("DTP") useful in blends with other polyolefins, especially other linear polyethylene polymers to form foamable or foamed articles. Desirably, the DTP improves the processability of linear polyethylenes when blended therewith, as can be evidenced, for example, by a decrease in the motor load of the extruder used to extrude the linear polyethylene. The DTP can be described by a number of features and properties as measured. It primarily is comprised of ethylene derived units, but will also comprise from 1.0 or 2.0 or 5.0 wt % to 12 or 16 or 20 wt % of a $C_4$ to $C_{10}$ α-olefin derived units based on the weight of the DTP, most preferably 1-butene, 1-hexene or 1-octene. The DTP also comprises from 0.01 or 0.05 or 1.0 wt % to 5.0 or 8.0 or 10.0 wt % diene derived units, preferably alpha-omega dienes, based on the weight of the DTP. In a further aspect, the DTP can include at least 50 mol %, at least 70 mol %, at least 80 mol %, or at least 90 mol % of units derived from ethylene. In another aspect, the DTP can have a melting point temperature ($T_m$) of 97.7° C. to 110.7° C.

The dienes are most preferably selected from the group consisting of 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, tetrahydroindene, norbornadiene also known as bicyclo-(2.2.1)-hepta-2,5-diene, dicyclopentadiene, 5-vinyl-2-norbornene, 1,4-cyclohexadiene, 1,5-cyclooctadiene, 1,7-cyclododecadiene, and combinations thereof. The DTP preferably has a density within the range of from 0.890 or 0.905 or 0.910 or 0.915 g/cm$^3$ to 0.920 or 0.925 g/cm$^3$.

The properties of the DTP can of course vary depending on the exact process used to make it, but preferably the DTP has the following measurable features. Certain DSC measurable properties include the following: The DTP preferably has a melting point temperature ($T_m$) within the range of from 95 or 100 or 110 or 115° C. to 125 or 130 or 135° C. The DTP also preferably has a crystallization temperature ($T_c$) within the range of from 75 or 80 or 85 or 90° C. to 110 or 115 or 120 or 125° C. The DTP also preferably has a heat of fusion ($H_f$) within the range of from 70 or 75 or 80 J/g to 90 or 95 or 100 or 110 or 120 or 130 or 140 J/g.

Certain melt flow properties of the DTP include the following: The DTP preferably has a melt index (190° C./21.6 kg, "$I_2$") of less than 5 or 4 or 3 or 2 or 1 or 0.5 g/10 min. The DTP has a wide ranging high load melt index ($I_{21}$), but preferably has a high load melt index (190/21.6, "$I_{21}$") of less than 10 or 8 or 6 or 4 or 2 or 1 g/10 min; or within the range of from 0.15 or 0.50 or 0.80 or 1.0 g/10 min to 1.5 or 4 or 5 or 6 or 8 or 10 g/10 min. The DTP has a melt index ratio (MIR, or $I_{21}/I_2$) within a range of from 20 or 25 or 30 to 70 or 75 or 80 or 85 or 90.

Certain dynamic properties of the DTP include the following: The DTP preferably has a Complex Viscosity at 0.1 rad/sec and a temperature of 190° C. within the range of from 20,000, or 50,000, or 100,000 or 150,000 P·s to 300,000 or 350,000 or 400,000 or 450,000 P·s. The DTP preferably has a Complex Viscosity at 100 rad/sec and a temperature of 190° C. within the range of from 500 or 700 P·s to 5,000 or 8,000 or 10,000 or 15,000 P·s. Also, the DTP preferably has a Phase Angle at the Complex Modulus of 10,000 Pa within the range of from 10 or 15 or 20 or 25° to 45 or 50 or 55 or 60° when the complex shear rheology is measured at a temperature of 190° C. The DTP preferably has a Phase Angle at the Complex Modulus of 100,000 Pa within the range of from 10 or 15° to 25 or 35 or 45° when the complex shear rheology is measured at a temperature of 190° C. Finally, the DTP has a level of branching indicated by the measured value of the branching index "$g'_{vis}$". The value for $g'_{vis}$ is preferably less than 0.95 or 0.92 or 0.90 or 0.80 or 0.75 or 0.60, or within a range of from 0.30 or 0.40 or 0.60 or 0.70 to 0.80 or 0.90 or 0.95. A polyethylene is "linear" when the polyethylene has no long chain branches, typically having a $g'_{vis}$ of 0.97 or above, preferably 0.98 or above. "Linear polyethylenes" preferably include ethylene polymers having a $g'_{vis}$ of 0.95 or 0.97 or more, and as further described herein. Thus, a lower value for $g'_{vis}$ indicates more branching. The inventive blends can however include blends of so-called long-chain branched LLDPEs with the DTP.

Shear thinning is observed for the DTPs and is a characteristic used to describe the diene terpolymer. "Shear thinning" is characterized by the decrease of the complex viscosity with increasing shear rate. One way to quantify the shear thinning is to use a ratio of complex viscosity at a frequency of 0.1 rad/s to the complex viscosity at a frequency of 100 rad/s. The "shear thinning ratio" is preferably greater than 10 or 20 or 30 or 40 or 50 for the DTPs used herein. More particularly, the shear thinning ratio of the DTP is within the range of from 5 or 10 or 20 to 40 or 50 or 60 or 70 or 100 or 200 or 300.

Certain GPC (LS or DRI) measurable features include the following: The weight average molecular weight of the DTP, Mw, as measured by LS, is within a range of from 100,000 or 120,000 or 150,000 or 250,000 g/mol to 300,000 or 350,000 or 400,000 or 500,000 g/mol; and the z-average molecular weight, Mz, as measured by LS, is preferably greater than 600,000 or 800,000 or 1,000,000 or 1,500,000 g/mole, or most preferably within a range of from 500,000 or 600,000 or 800,000 or 1,000,000 g/mol to 1,250,000 or 1,500,000 or 2,000,000 or 2,500,000 or 3,000,000 g/mole; and a number average molecular weight, Mn, as measured by DRI, is within a range of from 10,000 or 20,000 g/mol to 25,000 or 30,000 or 40,000 or 50,000 or 100,000 g/mole. The Mw/Mn of the DTPs is preferably greater than 3.0 or 4.0 or 4.5 or 5.0 or 5.5 or 6.0 or 7.0, and is most preferably within a range of from 3.5 or 4.0 or 5.0 to 10 or 12; and the Mz/Mn is preferably greater than 7.0 or 10.0 or 15.0 or 20.0, or more, and most preferably within a range of from 7.0 or 10.0 or 15.0 or 20.0 to 30.0 or 35.0 or 40.0 or 50.0. For the GPC data, DRI (differential reflection index) method is preferred for Mn, while LS (light scattering) is preferred for Mw and Mz.

Preferably the branched modifier (DTP) is gel-free. The presence of gel can be detected by dissolving the material in xylene at xylene's boiling temperature. The gel-free product should be dissolved in xylene. In one embodiment, the branched modifier (DTP) has 5 wt % or less, preferably 4 wt % or less, preferably 3 wt % or less, preferably 2 wt % or less, preferably 1 wt % or less, or preferably 0 wt % of xylene insoluble material.

Making the Diene Terpolymer

The DTP can be made by techniques generally known in the art for making polyethylenes, preferably as described in US 2013/0090433, especially solution, gas phase, or slurry phase polymerization processes using single-site catalysis. In particular, bridged tetrahydroindenyl zirconocenes or hafnocenes or substituted versions thereof are preferred single site catalysts when combined with known activator compounds such as perfluorinated organoboron compounds and/or aluminoxanes, most preferably methalumoxanes. As will be understood by those in the art, the identity of the catalyst and activator, their relative amounts, and the process conditions can be varied to effectuate the desired properties of the DTP as described above. Preferably, the catalyst composition is a bridged-bis(tetrahydroindenyl) zirconium dihalide or dialkyl, or bridged-bis(indenyl) zirconium dihalide or dialkyl, or substituted versions thereof, whereby the indenyl or tetrahydroindenyl chain may have $C_1$ to $C_{10}$ alkyl or phenyl substitutions at any one or more positions, especially the 2, 4 or 7 positions relative to the bridging position. The metallocenes are desirably activated with a so-called non-coordinating anion, preferably N,N-dialkyl anilinium tetrakis(perfluorinated aryl)borate, most preferably N,N-dimethyl anilinium tetrakis(heptafluoro-2-naphthyl)borate.

Desirable temperatures at which to carry out the slurry phase process to make the DTP is within the range of from 50 or 60° C. to 80 or 90 or 100 or 110° C. Hydrogen may be present in the slurry or solution process at a concentration of at least 50 ppm, or at least 100 ppm, or at least 150 ppm. Desirable temperature at which to carry out the solution phase processes to make the DTP is within the range of from 90 or 110° C. to 130 or 140 or 160 or 180° C. Finally, in either the slurry or solution process, desirable $C_4$ to $C_{10}$ α-olefin comonomer concentrations in the reactor are within the range of from 0.1 or 0.5 or 1 wt % to 2 or 5 or 10 or 15 wt %, and desirable diene feed rates are within the range of from 0.01 or 0.05 or 0.1 wt % relative to ethylene feed rate to 0.1 or 0.2 or 0.5 wt %.

Blends and Articles Incorporating the Diene Terpolymer

The DTPs are particularly useful as modifiers of "linear polyethylenes" such as LLDPEs or long chain branched polyethylenes ("LLDPE") that are used to form films and other articles. Preferably, highly branched LDPE is absent from the inventive blends. Examples of such linear polyethylenes include those such as disclosed in U.S. Pat. Nos. 8,399,581 and 7,951,873, and other traditional LLDPEs or so-called long-chain branched LLDPEs known in the art. The DTP improves the melt strength of the linear polyethylenes as well as its processability (e.g., as evidenced by increased output relative to LLDPE alone) and its Dart Impact and Tear Strength when made into films and other articles. Inventive compositions comprise, or preferably consist essentially of, or most preferably consist of a blend of LLDPE and the DTP. By "consist(ing) essentially of" what is meant is that the blend may also include common additives such as antioxidants, anti-slip agents, colorants and pigments, and other common additives to a level no greater than 5 wt % or 4 wt % or 3 wt % or 2 wt %.

Preferably, additives such as block, antiblock, antioxidants, pigments, fillers, processing aids, UV stabilizers, neutralizers, lubricants, surfactants and/or nucleating agents may also be present. Preferred additives include silicon dioxide, titanium dioxide, polydimethylsiloxane, talc, dyes, wax, calcium stearate, carbon black, low molecular weight resins and glass beads. Preferably these additives are present, if at all, from 0.1 or 1.0 ppm to 500 or 1000 ppm.

The "linear polyethylene" useful in the foamable or foamed articles described herein have certain desirable features. Preferably, the linear polyethylene consists of ethylene derived units, and in other embodiments the linear polyethylene may comprise within a range of from 0.10 or 0.50 or 1.0 wt % to 2.0 or 3.0 or 5.0 or 10.0 wt % $C_4$ to $C_{12}$ α-olefin derived units, the remainder being ethylene derived units. Preferably, the linear polyethylene has a density within a range of from 0.915 or 0.920 or 0.925 g/cm³ to 0.945 or 0.950 g/cm³. The Haze value for such blends, or formed from such blends, is preferably less than 50 or 40 or 30 or 20 or 10%.

The linear polyethylenes have certain desirable rheological properties. In a preferred embodiment of the invention, the linear polyethylenes have an $I_2$ (190° C./2.16 kg) within a range of from 0.50 or 0.80 g/10 min to 1.20 or 1.40 or 1.80 or 2.0 or 3.0 g/10 min. Also the linear polyethylenes preferably have an $I_{21}$ (190° C./21.6 kg) within a range of from 10 or 15 or 20 or 25 or 30 g/10 min to 40 or 45 or 50 g/10 min. Finally, the $I_{21}/I_2$ of the linear polyethylene is within a range of from 10 or 20 or 25 to 35 or 40 or 50 or 60.

The linear polyethylenes useful in the articles also have certain desirable melt and crystalline properties. In a preferred embodiment of the invention the linear polyethylene has a melting point temperature ($T_m$) within a range of from 106 or 110 or 112° C. to 134 or 138 or 140 or 144 or 148° C. Finally, the linear polyethylene in preferred embodiments of the invention has a crystallization temperature ($T_c$) within a range of from 95 or 100° C. to 115 or 120 or 125 or 130° C.

The DTPs are preferably present as a blend with the "linear polyethylenes" to form the articles within a range of from 0.1 or 0.2 or 0.5 or 1.0 to 4 or 6 or 8 wt % by weight of the blend. The blend is thus still considered unimodal in its GPC profile, but typically with a high molecular weight "bump" or "tail" as demonstrated in FIG. 1. Desirably, this high molecular weight region is that of the DTP and is highly branched.

Preferably, the linear polyethylene/DTP blend has a melt strength that is at least 5% higher than the melt strength of linear polyethylene used in the blend, preferably at least 10%, more preferably at least 20%, or at least 30%, or at least 40%, or at least 50%, or at least 100%, or at least 200%, or at least 300%, or at least 400%. Desirably, the melt strength of the DTP is within the range of from 5 or 10 or 15 or 20 or 30 cN to 40 or 50 or 60 cN, while that of the inventive blends is within the range of from 1 or 2 or 3 cN to 5 or 8 or 12 cN.

The polyethylene blends comprising one or more linear polyethylene and one or more DTPs show characteristics of strain-hardening in extensional viscosity. "Strain-hardening" is observed as a sudden, abrupt upswing of the extensional viscosity in the transient extensional viscosity vs. time plot. This abrupt upswing, away from the behavior of a linear viscoelastic material, was reported in the 1960s for LDPE (J. Meissner, 8 RHEOLOGY ACTA., 78 (1969)) and was attributed to the presence of long branches in the polymer. Preferably, the inventive diene terpolymers and polyethylene blends have strain-hardening in extensional viscosity. The "strain-hardening ratio" (SHR), which is defined as the ratio of the maximum transient extensional viscosity over three times the value of the transient zero-shear-rate viscosity at the same strain rate, for the inventive blends is preferably within the range of from 0.5 or 2.0 or 3.0 to 6.0 or 7.0 or 8.0 or 9.0 or 10.0 when the extensional viscosity is measured at a strain rate of 1 sec-1 and at a temperature of 150° C. For the DTP itself, the SHR can vary greatly, but is preferably within the range of from 4.0 or 5.0 or 10 to 20 or 40 or 60 at a strain rate of 1 sec-1 and at a temperature of 150° C.

The SHR of the blend is at least 10% higher than the SHR of the linear polyethylene used in the blend, preferably at least 20% higher, at least 30% higher, at least 50% higher, at least 100% higher, at least 500% higher, at least 800% higher, at least 1000% higher.

As mentioned, the inventive blend of the DTP with a linear polyethylene can improve the processability of the linear polyethylene. Evidence of this is demonstrated, for example, in the improved ability to extrude the blend as compared to the linear polyethylene alone. Preferably, the average motor load of an extruder, in extruding the blend through a die, has an average motor load of at least 1% or 2% or 3% or 4% or 5% or 8% or 10% less than the average motor load in the same extruder when extruding only the same linear polyethylene (or within a range of from 1 or 2 or 3% to 5 or 6 or 10%). Overall, the output from the extruder may increase as much as 10 or 20 or 30 or 40% or more for the inventive blends relative to the linear polyethylene alone.

The DTP blend with linear polyethylene also preferably has a crystallization temperature ($T_c$) within the range of from 85 or 90 or 95° C. to 110 or 115 or 120 or 125° C.; or, more preferably, the $T_c$ of the blend is at least 4 or 6 or 8 or 10° C. or more higher than that of the DTP alone.

Foamed Articles

The foamable and foamed articles of this invention typically utilize a foaming agent to cause expansion of the polymers by foaming. The process of foaming is well known in the art, and any suitable means is useful in the present invention. The inventive articles comprise (or consist essentially of) blends of the DTP and linear polyethylene and is thus "foamable". The blend preferably comprises (or consists essentially of) the DTP, linear polyethylene, and one or more foaming agents, in which case it is also "foamable." When acted upon (by, for example, heating) to activate the foaming agent, the article is said to be "foamed".

Particularly preferred foaming agents include both physical foaming agents and chemical foaming agents. Chemical foaming agents include azodicarbonamide, azodiisobutyronitrile, benzenesulfonhydrazide, 4,4-oxybenzene sulfonylsemicarbazide, p-toluene sulfonyl semi-carbazide, barium azodicarboxylate, N,N'-dimethyl-N,N'-dinitrosoterephthalamide, and trihydrazino triazine. Some are known by their tradenames, such as Hydrocerol™ by Boehringer Ingelheim Chemical Inc. (a sodium salt of polycarbonate acid and carbonate compounds in polyolefin matrix). As is known, this has a relatively low initiation temperature and the foaming agent can be selected to have a higher or lower initiation temperature as desired for a given application.

Chemical foaming agents also include organic foaming agents including aliphatic hydrocarbons having 1-9 carbon atoms, halogenated aliphatic hydrocarbons, having 1-4 carbon atoms, and aliphatic alcohols having 1-3 carbon atoms. Aliphatic hydrocarbons include methane, ethane, propane, n-butane, isobutane, n-pentane, isopentane, neopentane, and the like. Chemical foaming agents include halogenated hydrocarbons, preferably fluorinated hydrocarbons. Examples of fluorinated hydrocarbon include methyl fluoride; perfluoromethane; ethyl fluoride; 1,1-difluoroethane (HFC-152a); 1,1,1-trifluoroethane (HFC-143a); 1,1,1,2-tetrafluoro-ethane (HFC-134a); pentafluoroethane; perfluoroethane; 2,2-difluoropropane; 1,1,1-trifluoropropane; perfluoropropane; perfluorobutane; and perfluorocyclobutane. Partially halogenated chlorocarbons and chlorofluorocarbons for use in this invention include methyl chloride; methylene chloride; ethyl chloride; 1,1,1-trichloroethane; 1,1-dichloro-1-fluoroethane (HCFC-141b); 1-chloro-1,1-difluoroethane (HCFC-142b); 1,1-dichloro-2,2,2-trifluoroethane (HCFC-123); and 1-chloro-1,2,2,2-tetrafluoroethane (HCFC-124). Fully halogenated chlorofluorocarbons include trichloromonofluoromethane (CFC-11); dichlorodifluoromethane (CFC-12); trichlorotrifluoroethane (CFC-113); dichlorotetrafluoroethane (CFC-114); chloroheptafluoropropane; and dichlorohexafluoropropane. Fully halogenated chlorofluorocarbons are not preferred. Aliphatic alcohols useful as foaming agents include methanol, ethanol, n-propanol, and isopropanol.

Suitable inorganic foaming agents useful in making the foams of the present invention include carbon dioxide, nitrogen, argon, water, air, nitrogen, and helium. Inorganic foaming agents also include sodium bicarbonate; sodium carbonate; ammonium bicarbonate; ammonium carbonate; ammonium nitrite; nitroso compounds, such as N,N'-dimethyl-N,N'-dinitrosoterephthalamide and N,N'-dinitrosopentamethylene tetramine; azo compounds, such as azodicarbonamide, azobisisobutylonitrile, azocyclohexylnitrile, azodiaminobenzene, and bariumazodicarboxylate; sulfonyl hydrazide compounds, such as benzene sulfonyl hydrazide, toluene sulfonyl hydrazide, p,p'-oxybis(benzene sulfonyl hydrazide), and diphenyl sulfone-3,3'-disulfonyl hydrazide; and azide compounds, such as calcium azide, 4,4'-diphenyl disulfonyl azide, and p-toluene sulfonyl azide.

The amount of foaming agent incorporated into the polymer composition (typically the polymer melt) to make a foam-forming polymer composition (typically a gel) is preferably from 0.01 to 10 wt % and most preferably from 0.1 to 5 wt %, based on the total material in the blend. The level of foaming agent is often altered to obtain a desired foam density.

A foaming assistant can be used with the foaming agent. The simultaneous use of the foaming agent with a foaming assistant contributes to lowering of the decomposition temperature of the foaming agent, acceleration of decomposition and homogenization of bubbles. Examples of the foaming assistant may include organic acids such as salicylic acid, phthalic acid, stearic acid and nitric acid, urea and derivatives thereof. The amount of foaming assistant incorporated into the polymer composition (typically the polymer melt) is preferably from 0.01 to 10 wt % and most preferably from 0.1 to 5 wt %, preferably 0.5 to 3 wt %, based on the total material in the blend.

The foamed articles have certain desirable features. In a preferred embodiment of the invention, the melt strength of the foamed article is within a range of from 2 or 4 cN to 8 or 10 cN. Also, in preferred embodiments the specific gravity of the foamed article is within a range of from 0.60 or 0.65 or 0.70 g/cm³ to 0.80 or 0.85 or 0.90 g/cm³. The specific gravity of the foamed article is reduced by at least 5 or 8 or 10 or 15 or 20% relative to the foamed linear polyethylene without the diene terpolymer.

The compositions of this invention may be used in any known application involving molding or extrusion, including consumer goods, industrial goods, construction materials, packaging materials, and automotive parts. For example, the foam articles can be used as weather seals for the automotive industry, where the object is to reduce road noise, dust, grit, and moisture intake at the various openings, such as window seals, door seals, and trunk seals. The elastomeric characteristics of the inventive composition allow it to conform to the shapes needed and to be effectively compressed into gaps and corners at the openings of the automotive openings when they are closed such that compressed foam hinders the entry of the noise, dust, and moisture.

In the case of food packaging, polyethylene foam offers a lightweight packaging solution with excellent grease/fat/oil resistance. Its high heat stability means products are microwaveable, with good thermal insulation giving them a 'cool touch' during removal.

The various descriptive elements and numerical ranges disclosed herein for the inventive articles incorporating the DTPs can be combined with other descriptive elements and numerical ranges to describe the invention; further, for a given element, any upper numerical limit can be combined with any lower numerical limit described herein. The features of the invention are demonstrated in the following non-limiting examples.

EXAMPLES

Test Methods

All test methods are well known in the art and published in US 2013/0090433 A1. The crystallization and melting point temperatures were determined by Differential Scanning calorimetry at 10° C./min. The melt flow parameters are determined per ASTM D 1238 190° C., 2.16 kg. Polymer molecular weight (weight-average molecular weight, Mw, number-average molecular weight, Mn, and z-averaged molecular weight, Mz) and molecular weight distribution (Mw/Mn) are determined using Size-Exclusion Chromatography. Equipment consists of a High Temperature Size Exclusion Chromatograph (either from Waters Corporation or Polymer Laboratories), with a differential refractive index detector (DRI), an online light scattering detector, and a viscometer (SEC-DRI-LS-VIS). For purposes of the claims, SEC-DRI-LS-VIS shall be used. Three Polymer Laboratories PLgel 10 mm Mixed-B columns are used. The nominal flow rate is 0.5 cm$^3$/min and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of reagent grade 1,2,4-trichlorobenzene (TCB). The TCB mixture is then filtered through a 0.7 μm glass pre-filter and subsequently through a 0.1 μm Teflon filter. The TCB is then degassed with an online degasser before entering the SEC.

For ethylene copolymers with alpha-omega-dienes, propylene, and 1-butene the presence of long chain branched structures in the branched modifier can be detected using nuclear magnetic resonance spectroscopy (NMR). In $^{13}$C-NMR, the modifiers are dissolved in tetrachloroethane-d2 at 140° C. and the spectra are collected at 125° C. Assignments of peaks for ethylene/propylene, ethylene/butene, ethylene/hexene, and ethylene/octene copolymers have been reviewed by James C. Randall in 29(2) POLYMER REVIEWS, 201-317, (1989). Assignments for propylene/butene, propylene/pentene, propylene/hexene, propylene/heptene, and propylene/octene are presented by U. M Wahner, et al., (204 MACROMOL. CHEM. PHYS. 1738-1748 (2003)). These assignments were made using hexamethyldisiloxane as the internal standard. To convert them to the same standard used in the other references add 2.0 to the chemical shifts. Assignments and a method of measuring decene concentration have been reported for propylene/ethylene/decene terpolymers in Escher, Galland, and Ferreira (41 J. POLY. SCI., PART A: POLY. CHEM., 2531-2541 (2003)) and Ferreira, Galland, Damiani, and Villar (39 J. POLY. SCI, PART A: POLY. CHEM, 2005-2018 (2001)). The peaks in the $^{13}$C-NMR spectrum of ethylene/norbornadiene copolymers are assigned by Mönkkönen and Pakkanen (200 MACROMOL. CHEM. PHYS., 2623-2628 (1999)) and Radhakrishnan and Sivaram (200 MACROMOL. CHEM. PHYS., 858-862 (1999). More details are disclosed in US 2013/0090433 A1.

Foamed Articles

Two diene terpolymers (Examples 1 and 2) were produced for evaluation of the inventive foamable or foamed articles. The two diene terpolymers were made in a continuous stirred-tank reactor operated in a solution process. The reactor was a 1.0-liter stainless steel autoclave reactor and was equipped with a stirrer, a water cooling/steam heating element with a temperature controller and a pressure controller. Solvents and all monomers were first purified by passing through a three-column purification system. The purification system consisted of an Oxiclear column (Model No. RGP-R1-500 from Labclear) followed by a 5 Å and a 3 Å molecular sieve column. The purified solvents and monomers were then chilled to about −15° C. by passing through a chiller before being fed into the reactor through a manifold. Ethylene was delivered as a gas solubilized in the chilled solvent/monomer mixture. Solvent and monomers were mixed in the manifold and fed into the reactor through a single tube. 1,9-decadiene was diluted with isohexane and fed into the reactor using a metering pump. All liquid flow rates were measured using Brooksfield mass flow controller.

The catalyst used was rac-dimethylsilylbis(indenyl)zirconium dimethyl. The metallocenes were pre-activated with an activator of N,N-dimethyl anilinium tetrakis(heptafluoro-2-naphthyl)borate at a molar ratio of about 1:1 in toluene. The preactivated catalyst solution was kept in an inert atmosphere and was fed into the reactor by a metering pump through a separated line. Catalyst and monomer contacts took place in the reactor.

As an impurity scavenger, 100 ml of tri-n-octyl aluminum (TNOA) (25 wt % in hexane, Sigma Aldrich) was diluted in 11.35 kilogram of isohexane. The TNOA solution was stored in a 18.9-liter cylinder under nitrogen blanket. The solution was used for all polymerization runs until about 90% of consumption, and then a new batch was prepared. The feed rates of the TNOA solution were adjusted in a range from 0 (no scavenger) to 4 ml per minute to achieve a maximum catalyst activity.

The reactor effluent containing mostly solvent, polymer and unreacted monomers, was collected in a collection box. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of about 2 MPa. The polymerization process condition and some characterization data are listed in Table 1. For each polymerization run, the catalyst feed rate and scavenger feed rate were adjusted to achieve a desired conversion listed in Table 1.

TABLE 1

Production and Properties of DTP's for Foamed Articles

| Parameter | Example 1 | Example 2 |
|---|---|---|
| Polymerization temperature (° C.) | 130 | 130 |
| Isohexane flow rate (g/min) | 54 | 55.2 |
| Ethylene feed rate (slpm) | 8 | 8 |
| 1-hexene feed rate (g/min) | 1.8 | 1.8 |
| 1,9-decadiene feed rate (ml/min) | 0.03 | 0.024 |
| Yield (gram/min) | 9.18 | 9.54 |
| Conversion (%) | 84.5 | 87.9 |
| Catalyst efficiency (g poly/g cat) | 689,031 | 636,630 |
| Ethylene content (wt %) | 90.3 | 88.9 |
| Tc (° C.) | 96.7 | 94.0 |
| Tm (° C.) | 113.8 | 110.5 |
| Heat of fusion (J/g) | 113.3 | 122.0 |
| Mn DRI (g/mol) | 40,224 | 32,639 |

TABLE 1-continued

Production and Properties of DTP's for Foamed Articles

| Parameter | Example 1 | Example 2 |
| --- | --- | --- |
| Mw DRI (g/mol) | 201,472 | 161,327 |
| Mz DRI (g/mol) | 687,457 | 534,428 |
| Mn LS (g/mol) | 76,650 | 44,613 |
| Mw LS (g/mol) | 362,493 | 223,146 |
| Mz LS (g/mol) | 1,923,817 | 1,030,000 |
| $g'_{vis}$ | 0.519 | 0.616 |
| $I_2$ (g/10 min) | <0.1 | <0.1 |
| $I_{21}$ (g/10 min) | 0.03 | 0.233 |
| Complex viscosity@ 0.1 rad/sec (Pa · s) | 469,000 | 259,000 |
| Complex viscosity@ 100 rad/sec (Pa · s) | 2,126 | 1,534 |
| Phase angle at G* = 100000 Pa (degree) | 19.3 | 21.99 |

Compounding Process

Two linear polyethylene "base resins" were selected and they are:

1. Enable 2010 (0.920 g/cm³, 1.0 g/10 min melt index (190° C./2.16 kg) a metallocene catalyzed resin with low levels of long chain branching available from ExxonMobil Chemical Co.
2. "Experimental Ziegler-Natta PE" is a 0.944 D/1.25 MI polyethylene produced by Ziegler Natta catalyst with no long chain branching.

TABLE 2

Linear Polyethylene Properties

|  | Unit | Enable 2010 Commercial Metallocene | Experimental Ziegler-Natta |
| --- | --- | --- | --- |
| Density | g/cm³ | 0.920 | 0.944 |
| $I_2$ | g/10 min | 1.0 | 1.25 |
| $I_{21}$ | g/10 min | 34 | 34 |
| MIR | — | 34 | 27 |
| Melting Temperature | ° C. | 113 | 131 |
| Crystallization Temperature | ° C. | 103 | 113 |

Two blends were produced on a 1" Haake twin screw extruder.

1. (B, C in Table 5) 3% Example 2 DTP+Enable 2010;
2. (E in Table 5) 3% Example 1 DTP+Experimental Ziegler Natta PE.

The DTP was homogenized with an antioxidant package (500 ppm Irganox 1076 and 2,000 ppm Weston 399) in a 1" Haake twin screw extruder and was pelletized. 3% pelletized DTP was further mixed with the corresponding base resin in the same 1" Haake twin screw extruder to form the blends. The extrusion conditions for both DTP homogenization and the blend compounding are the same and are listed in Table 3.

TABLE 3

Haake Compounding Extrusion Condition

| Extrusion Condition | value |
| --- | --- |
| Zone 1 (° C.) | 180 |
| Zone 2 (° C.) | 185 |
| Zone 3 (° C.) | 190 |
| Die (Zone 5) (° C.) | 195 |
| Extruder Speed (rpm) | 55 |

Foaming Experimental

The foaming experiments were conducted on a single extruder foaming line. The extruder used was a 2.5" Davis, 30:1 L/D, water cooled barrels. The screw design was a GP with a Maddock mixing section. The die design is an adjustable flex lip, 12" wide, internal coat hanger design with an "R" bar (restrictor bar) to manipulate flow. The thickness range was 0.020" to about 0.110". A set of 3 stack rolls of 36" wide and about 1 foot in diameter were used to cool, keep foamed sheet flat and improve the surface appearance. Typical process conditions are shown in Table 4 below.

TABLE 4

Typical Foaming Extrusion Condition

| Extrusion Condition | Unit | Set Point |
| --- | --- | --- |
| Zone #1 | ° C. | 177 |
| Zone #2 | ° C. | 193 |
| Zone #3 | ° C. | 207 |
| Zone #4 | ° C. | 424 |
| Adaptor #1 | ° C. | 218 |
| Adaptor #2 | ° C. | 221 |
| Die #2 | ° C. | 207 |
| Die #3 | ° C. | 207 |
| Die #4 | ° C. | 207 |
| Extruder Speed | rpm | 45 |
| Extruder AMP | % | 36-41 |
| Melt Temp at Extruder | ° C. | 199-210 |
| Melt Temp at Adaptor | ° C. | 210 |
| Extruder Pressure - End | PSI | 1600-2300 |

For most of the examples, 4% of a chemical foaming agent Ecocell™ LD from Polyfill Additives Technology (Rockaway, N.J.) was used. Hydrocerol is another chemical foaming agent from Clariant International Ltd (Switzerland). The foaming agent was dry-mixed with the blends and was subsequently fed into the foaming extruder. The specific gravity of the foamed article is measured using the following test method: A sample with weight between 1 to 3 grams is weighted both in air and in water in the environment of 23±2° C. Then the specific gravity is calculated using the following formulation. The results of the foaming are in Table 5.

$$\text{Specific Gravity} = \frac{\text{Specific gravity of water at } t\, °\text{C.} \times \text{weight of sample in air}}{\text{weight of sample in air} - \text{weight of sample in water}}$$

TABLE 5

Foamed Articles

| Sample Description | | A<br>Enable<br>2010 | B<br>3% Example 2 +<br>Enable 2010 | C<br>3% Example 2 +<br>Enable 2010 | D<br>Exp'l<br>ZN PE | E<br>3% Example 1 +<br>Exp'l ZN PE |
|---|---|---|---|---|---|---|
| Resin Density (D)/ Melt Index (MI) | [g/cm³]/ [g/10 min] | 0.920D/1.0MI | 0.920D/1.0MI | 0.920D/1.0MI | 0.944D/1.2MI | 0.944D/1.2MI |
| Foaming Agent | | Ecocell LD | Ecocell LD | Hydrocerol | Ecocell LD | Ecocell LD |
| Foaming Agent Percentage | % | 4.0% | 4.0% | 4.0% | 4.0% | 4.0% |
| Specific Gravity | [g/cm³] | 0.887 | 0.787 | 0.650 | 0.861 | 0.772 |
| Specific Gravity Reduction | % | 3.6% | 14.5% | 29.3% | 8.8% | 18.2% |
| Sample Gauge | mm | 1.0 | 1.0 | — | 1.0 | 1.0 |
| Sample Amount | ft | 5~10 | 5~10 | — | 5~10 | 5~10 |

Figure 5:
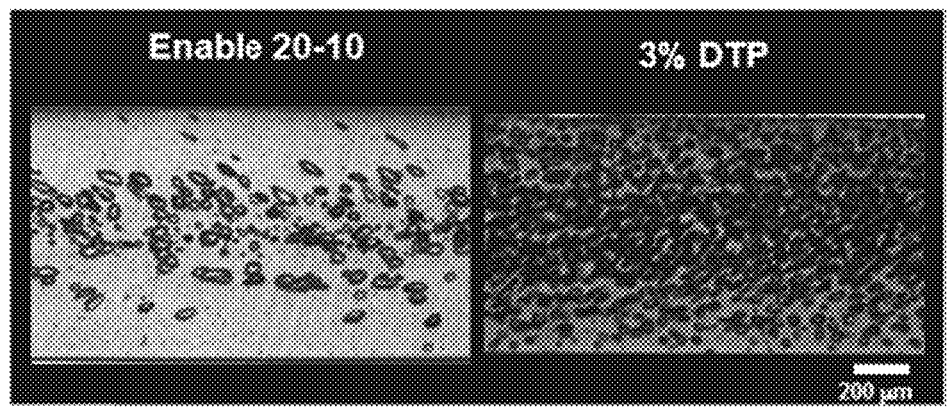
FIG. 5 are the micrographs of foam cell structures for foamed Enable 2010 and the corresponding 3% DTP blend.

FIG. 5 is a micrograph showing the advantageous features of the foamed blend and article. The micrograph on the left in FIG. 5 corresponds to Example A, and the one on the right to Figure B. These two micrographs illustrate the advantage of DTP addition. Primarily, the cell population is much higher in the DTP blend, which is directly related to the foamed article density reduction. The cell size appears to be smaller and the cells are well distributed. Furthermore, the cells are still all closed cells at higher population. Close cell is conducive for better mechanical properties.

Now, having described the various aspects of the blends of linear polyethylenes with the DTPs, and the foamed articles therefrom, described here in numbered paragraphs are:

P1. A foamed or foamable article comprising (or consisting essentially of) a blend of a diene terpolymer and a linear polyethylene, the diene terpolymer comprising from 0.01 wt % to 10.0 wt % diene derived units, and 1.0 wt % to 20 wt % of $C_4$ to $C_{10}$ α-olefin derived units based on the weight of the diene terpolymer, wherein the diene terpolymer has:
  a) a $g'_{vis}$ of less than 0.90;
  b) an Mw within a range of from 100,000 g/mol to 500,000 g/mol;
  c) an Mw/Mn within the range of from 3.5 to 12; and
  d) an Mz/Mn of greater than 7.0.

P2. The article of claim 1, wherein the diene terpolymer comprises (or consists of) ethylene derived units and diene derived units, most preferably alpha-omega diene derived units; wherein the diene terpolymer also comprises within the range from 1.0 or 2.0 or 5.0 wt % to 12 or 16 or 20 wt % of a $C_4$ to $C_{10}$ α-olefin derived units based on the weight of the diene terpolymer.

P3. The article of paragraph 1, wherein the diene terpolymer has a shear thinning ratio of 40 or more.

P4. The article of any one of the previous paragraphs, wherein the diene terpolymer has a heat of fusion ($H_f$) within the range of from 70 J/g to 140 J/g.

P5. The article of any one of the previous paragraphs, wherein the diene terpolymer has a melting point temperature ($T_m$) within the range of from 95° C. to 135° C.

P6. The article of any one of the previous paragraphs, wherein the diene terpolymer has an Mz within a range of from 500,000 g/mol to 3,000,000 g/mol.

P7. The article of any one of the previous paragraphs, wherein the diene terpolymer has a phase angle at complex shear modulus G*=100,000 Pa of 40° or less, or within the range of from 10° to 35°.

P8. The article of any one of the previous paragraphs, wherein the diene is selected from the group consisting of: 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, tetrahydroindene, norbornadiene also known as bicyclo-(2.2.1)-hepta-2,5-diene, dicyclopentadiene, 5-vinyl-2-norbornene, 1,4-cyclohexadiene, 1,5-cyclooctadiene, 1,7-cyclododecadiene, and combinations thereof.

P9. The article of any one of the previous paragraphs, wherein the DTP has a density within the range of from 0.890 or 0.905 or 0.910 or 0.915 g/cm³ to 0.920 or 0.925 g/cm³.

P10. The article of any one of the previous paragraphs, wherein the DTP is present in the blend within a range of from 0.1 or 0.5 or 1.0 to 4 or 6 or 8 or 10 wt % by weight of the blend.

P11. The article of any one of the previous paragraphs, wherein the linear polyethylene has a density within a range of from 0.915 or 0.920 or 0.925 g/cm³ to 0.945 or 0.950 g/cm³.

P12. The article of any one of the previous paragraphs, wherein the $I_2$ (190° C./2.16 kg) of the linear polyethylene is within a range of from 0.50 or 0.80 g/10 min to 1.20 or 1.40 or 1.80 or 2.0 or 3.0 g/10 min.

P13. The article of any one of the previous paragraphs, wherein the $I_{21}$ (190° C./21.6 kg) of the linear polyethylene is within a range of from 10 or 15 or 20 or 25 or 30 g/10 min to 40 or 45 or 50 g/10 min.

P14. The article of any one of the previous paragraphs, wherein the $I_{21}/I_2$ of the linear polyethylene is within a range of from 10 or 20 or 25 to 35 or 40 or 50 or 60.

P15. The article of any one of the previous paragraphs, wherein the linear polyethylene has a melting point temperature (Tm) within a range of from 106 or 110 or 112° C. to 134 or 138 or 140 or 144 or 148° C.

P16. The article of any one of the previous paragraphs, wherein the linear polyethylene has a crystallization temperature (Tc) within a range of from 95 or 100° C. to 115 or 120 or 125 or 130° C.

P17. The article of any one of the previous paragraphs, wherein the diene terpolymer has a strain hardening ratio of 3 or more.

P18. The article of any one of the previous paragraphs, wherein the blend also comprises a foaming agent within the range of from 0.5 or 1.0 or 2.0 wt % to 3.0 or 4.0 or 5.0 or 6.0 wt % based on the weight of the composition.

P19. The article of paragraph 18, wherein the melt strength of the foamed article is within a range of from 2 or 4 cN to 8 or 10 cN.

P20. The article of paragraphs 18-19, wherein the specific gravity of the foamed article is within a range of from 0.60 or 0.65 or 0.70 g/cm³ to 0.80 or 0.85 or 0.90 g/cm³.

P21. The article of paragraphs 18-20, wherein the specific gravity of the foamed article is reduced by at least 5 or 8 or 10 or 15% relative to the foamed linear polyethylene without the diene terpolymer.

P22. An automotive part made from the article of any one of the previous claims.

Also described herein is the use of the DTP in a blend with a linear polyethylene to form a foamable or foamed article.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A foamed article comprising a blend of a diene terpolymer and a linear polyethylene, the linear polyethylene has a $g'_{vis}$ of 0.95 or more, the diene terpolymer comprising units derived from ethylene, units derived from a diene, and units derived from a $C_4$ to $C_{10}$ α-olefin, wherein the diene terpolymer comprises 1.0 wt % to 10.0 wt % of the units derived from the diene based on a total weight of the diene terpolymer, and wherein the diene terpolymer comprises a majority of the units derived from ethylene based on the total weight of the diene terpolymer, wherein the diene is selected from the group consisting of: 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and combinations thereof, and wherein the diene terpolymer has:
   a) a $g'_{vis}$ of less than 0.90;
   b) an Mw within a range of from 100,000 g/mol to 500,000 g/mol;
   c) an Mw/Mn within the range of from 3.5 to 12;
   d) an Mz/Mn of greater than 7.0,
   e) an Mz within a range of from 1,000,000 g/mol to 3,000,000 g/mol, and
   f) a melting point temperature ($T_m$) of 97.7° C. to 110.7° C., wherein the Mw, Mn, and Mz values are measured with a size-exclusion chromatograph equipped with a differential refractive index detector, a light scattering detector, and a viscometer.

2. The article of claim 1, wherein the diene terpolymer has a shear thinning ratio of 40 or more.

3. The article of claim 1, wherein the diene terpolymer has a heat of fusion ($H_f$) within the range of from 70 J/g to 140 J/g.

4. The article of claim 1, wherein the diene is selected from the group consisting of: 1,4-pentadiene, 1,9-decadiene, and a combination thereof.

5. The article of claim 1, wherein the diene terpolymer has a density within the range of from 0.890 g/cm³ to 0.925 g/cm³.

6. The article of claim 1, wherein the linear polyethylene has a density within a range of from 0.915 g/cm³ to 0.950 g/cm³.

7. The article of claim 1, wherein the $I_2$ (190° C./2.16 kg) of the linear polyethylene is within a range of from 0.50 g/10 min to 3.0 g/10 min.

8. The article of claim 1, wherein the $I_{21}$ (190° C./21.6 kg) of the linear polyethylene is within a range of from 10 g/10 min to 50 g/10 min.

9. The article of claim 1, wherein the $I_{21}/I_2$ of the linear polyethylene is within a range of from 10 to 60.

10. The article of claim 1, wherein the linear polyethylene has a melting point temperature (Tm) within a range of from 106° C. to 148° C.

11. The article of claim 1, wherein the linear polyethylene has a crystallization temperature (Tc) within a range of from 95° C. to 130° C.

12. The article of claim 1, wherein the diene terpolymer has a strain hardening ratio of 3 or more.

13. An automotive part made from the article of claim 1.

14. The article of claim 1, wherein the diene terpolymer comprises 5 wt % or less of xylene insoluble material.

15. The article of claim 1, wherein the diene terpolymer is essentially gel free.

16. The article of claim 1, wherein:
   the diene terpolymer comprises at least 80 mol % of units derived from ethylene,
   the $C_4$ to $C_{10}$ α-olefin a comprises 1-hexene, 1-octene, or a combination thereof,
   the diene comprises 1,9-decadiene, and
   the diene terpolymer comprises 5 wt % or less of xylene insoluble material.

17. The article of claim 1, wherein the diene terpolymer consists essentially of at least 80 mol % of units derived from ethylene, the units derived from the $C_4$ to $C_{10}$ α-olefin, and the units derived from the diene, wherein:
   the $C_4$ to $C_{10}$ α-olefin a comprises 1-hexene, 1-octene, or a combination thereof,
   the diene comprises 1,9-decadiene, and
   the diene terpolymer comprises 5 wt % or less of xylene insoluble material.

18. The article of claim 1, wherein the diene terpolymer consists essentially of at least 80 mol % of units derived from ethylene, the units derived from the $C_4$ to $C_{10}$ α-olefin, and the units derived from the diene, wherein:
   the $C_4$ to $C_{10}$ α-olefin consists essentially of 1-octene, 1-hexene, or a mixture thereof,
   the diene consists essentially of 1,9-decadiene, and
   the diene terpolymer comprises 5 wt % or less of xylene insoluble material.

19. The article of claim 1, wherein the diene terpolymer consists of at least 80 mol % of units derived from ethylene, the units derived from the $C_4$ to $C_{10}$ α-olefin, and the units derived from the diene, wherein:
   the $C_4$ to $C_{10}$ α-olefin consists of 1-octene,
   the diene consists of 1,9-decadiene, and
   the diene terpolymer comprises 5 wt % or less of xylene insoluble material.

20. The article of claim 1, wherein the diene terpolymer consists of at least 80 mol % of units derived from ethylene, the units derived from the $C_4$ to $C_{10}$ α-olefin, and the units derived from the diene, wherein:
   the $C_4$ to $C_{10}$ α-olefin consists of 1-octene,
   the diene consists of 1,9-decadiene, and
   the diene terpolymer is essentially gel free.

* * * * *